Sept. 10, 1929.   H. W. LEAVITT ET AL   1,727,652
MUD LUG
Filed March 24, 1928
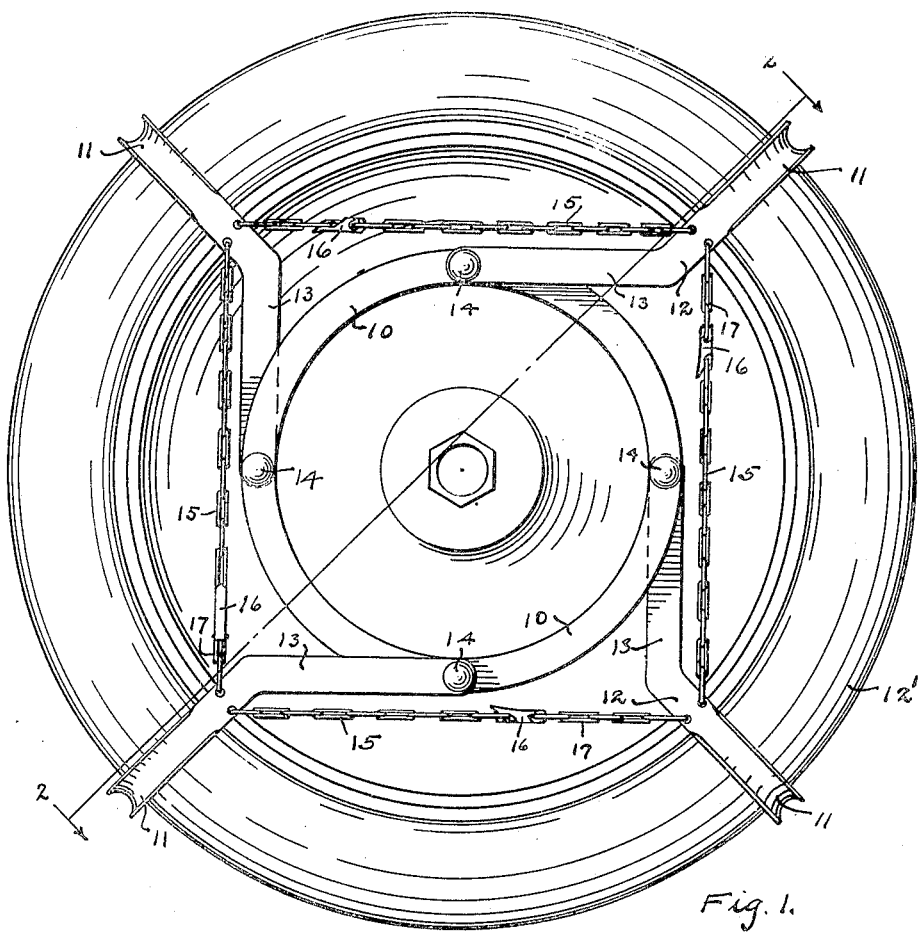
Fig. 1.
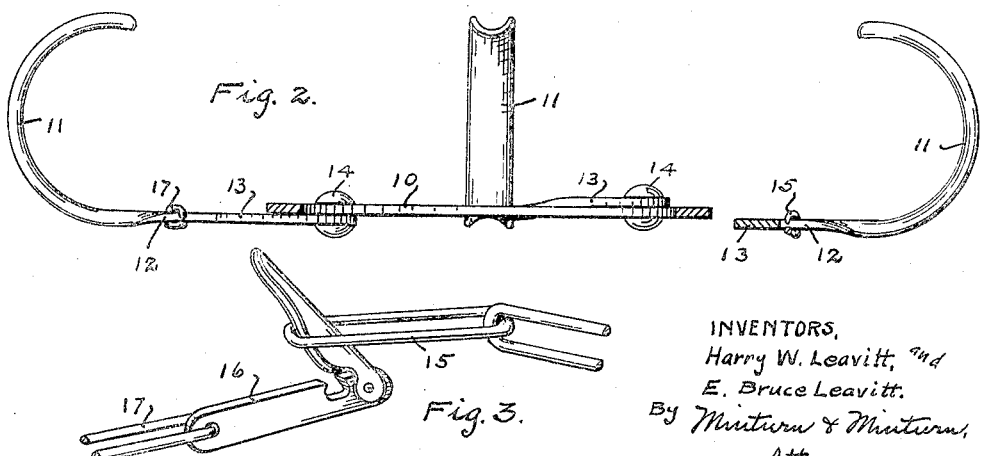
INVENTORS,
Harry W. Leavitt, and
E. Bruce Leavitt.
By Minturn & Minturn,
Attorneys.

Patented Sept. 10, 1929.

1,727,652

UNITED STATES PATENT OFFICE.

HARRY W. LEAVITT AND ELMER BRUCE LEAVITT, OF HAMMOND, ILLINOIS.

MUD LUG.

Application filed March 24, 1928. Serial No. 264,326.

This invention herein termed mud-lugs relates to means to be removably applied to wheels for the purpose of securing traction under adverse conditions such as in mud or snow, or on ice. It often happens that a drive wheel of a vehicle sinks in a soft roadway and starts to spinning in the mud. Under such a condition it is practically impossible to get a chain of the usual type circumferentially around the wheel tire, and even if it were possible the chain would only cause the wheel to dig in deeper without aiding in lifting out the wheel.

The mud-lugs comprising this invention can be applied to the wheel from the side even though the wheel be down in the mud, and are adjustable to a wide range of wheel or tire diameters. One particular form of the invention is hereinbelow described in reference to the accompanying drawing, in which—

Fig. 1, is a side elevation of a set of mud-lugs applied to a wheel;

Fig. 2, a section on the line 2—2 in Fig. 1, through the mud-lugs with the wheel and tire omitted; and Fig. 3, a perspective view of a chain adjusting fastener in a partly open position.

Like characters of reference indicate like parts throughout the several views in the drawing.

We form a ring 10 of sufficient diameter to permit any hub projection if present to extend therethrough, and to this ring 10, pivotally attach a plurality of mud hooks 11, here shown as four in number.

Each mud hook 11 has its outer end formed to hook around from the outer face of the tire 12' and extend down on the inner face of the tire somewhat so that the hook must be pulled radially outwards from the tire to be removed therefrom. From the hook 11 extends a shank 12 bent angularly to form an arm 13 which extends to the ring 10 to be secured thereto by the rivet 14 about which the shank 12 is free to turn in a plane parallel to that of the ring 10. The points of attachment of the arms 13 to the ring 10 are equally spaced one from the other about the ring, each rivet 14 passing through the ring 10 at 90 degrees from the next adjacent rivet when four hooks 11 are employed as here shown.

To each shank 12, just back of the hook 11 is secured a chain 15 by one end which is pulled toward the next adjacent shank 12 substantially in the direction of the arm 13 of the same shank to which it is secured to be engaged by a clasp or fastener 16 carried on the end of a chain 17 which is secured by its other end to the next adjacent shank 12. The distance between the two adjacent shanks 12 may, therefore, be varied by engaging the fastener 16 in various links of the chain 15 to pull the hooks 11 toward each other or to let them swing farther apart.

It is to be seen that by suitably adjusting the chains between the hooks 11 that the hooks may be swung from the ring 10 to include thereunder tires of an appreciable range in diameters. By revolving the ring 10 in a counterclockwise direction after the hooks 11 are slipped over the tire (Fig. 1) with three of the chains 15 and 17 fastened together by their respective fasteners 16, all of the hooks 11 are suitably pulled into contact with the tire 12.

The fourth chains 15 and 17 may then be secured one to the other by the fastener 16 to give the desired pressure of the hooks 11 against the tire.

The particular shape of the hook 11 may be varied to suit different conditions, but we find that a hook formed with a U-shaped cross section (Fig. 2) is effective in that it presents a curved or rounded face toward the tire 12 and two edges toward the roadway to bite in to prevent slippage.

While the invention has herein been described in one particular form it is obvious that many structural variations may be had without departing from the spirit of the invention, such, for example, as using three hooks 11 or any number thereover, and we, therefore, do not desire to be limited to the precise structure as shown and described, nor any more than may be required by the following claims.

We claim:

1. In an anti-skid device, the combination with a ring of a plurality of arms pivoted at their ends to the ring and bent to form a shank angularly disposed to the arm, the outer end of the shank being formed into a hook adapted to extend from the outer face of a tire around the tread and somewhat down on the inner face of the tire, and ties connecting the shank of each arm with the shank of the next adjacent arm.

2. In an anti-skid device, the combination with a ring of a plurality of arms pivoted at their ends to the ring and bent to form a shank angularly disposed to the arm, the outer end of the shank being formed into a hook adapted to extend from the outer face of a tire around the tread and somewhat down on the inner face of the tire, and ties connecting the shank of each arm with the shank of the next adjacent arm, and means for varying the lengths of the ties to vary the distance apart of the hooks.

3. In an anti-skid device, the combination with a ring of a plurality of arms pivoted at their ends to the ring and bent to form a shank angularly disposed to the arm, the outer end of the shank being formed into a hood adapted to extend from the outer face of a tire around the tread and somewhat down on the inner face of the tire, two-part chains attached to adjacent shanks, and a clasp on one chain engaging a link of the other chain to adjustably connect their respective shanks.

In testimony whereof we affix our signatures.

HARRY W. LEAVITT.
E. BRUCE LEAVITT.